Oct. 13, 1925.
A. P. VOLLMAR
1,557,504
APPARATUS FOR MOLDING GLASS
Filed Aug. 27, 1921     2 Sheets-Sheet
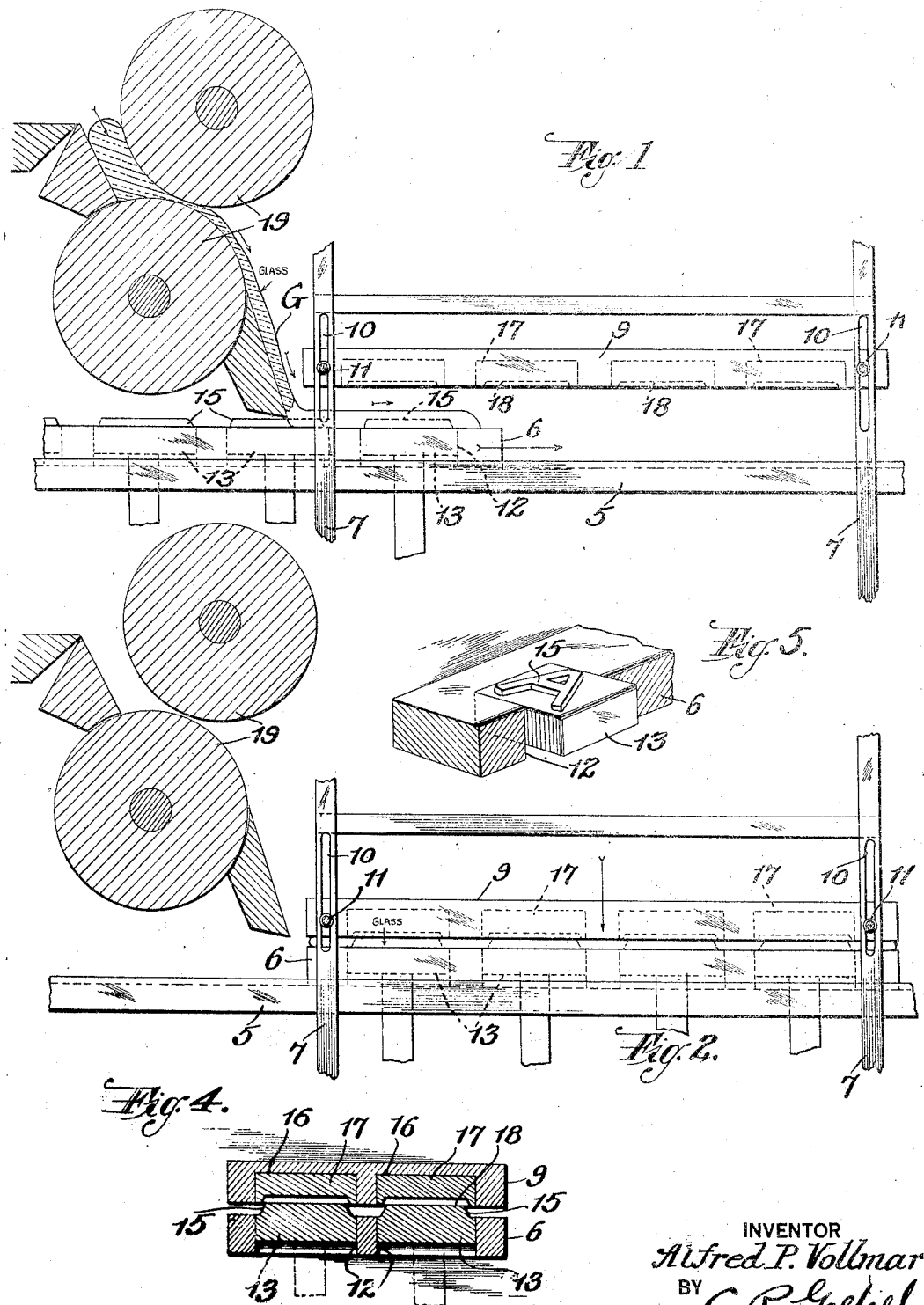
INVENTOR
Alfred P. Vollmar
BY
C. P. Goepel
ATTORNEY Oct. 13, 1925.
A. P. VOLLMAR
1,557,504
APPARATUS FOR MOLDING GLASS
Filed Aug. 27, 1921
2 Sheets-Sheet 2
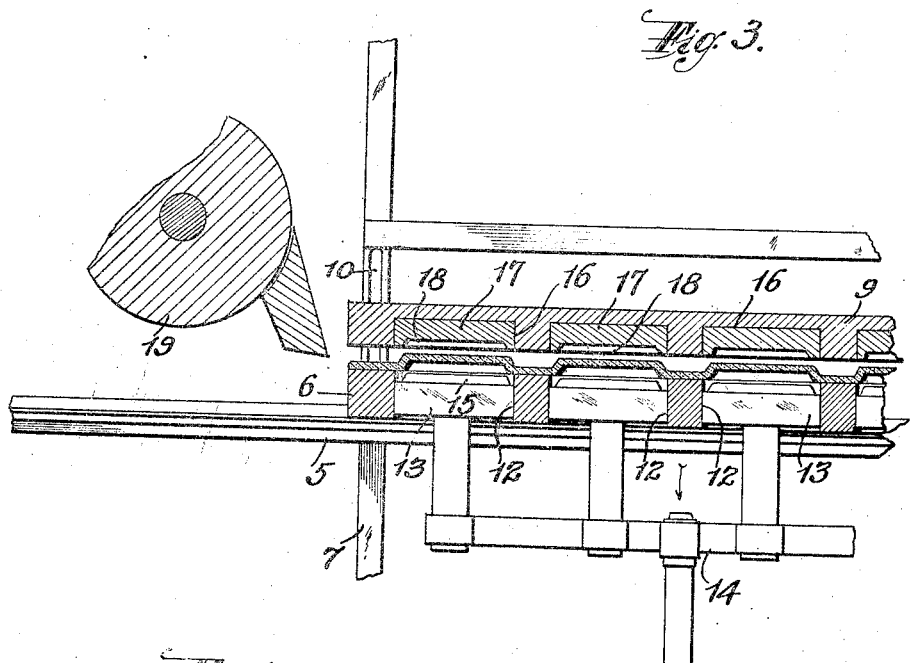
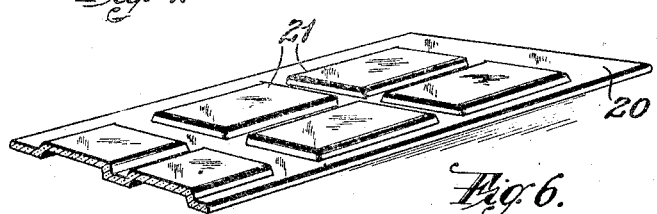
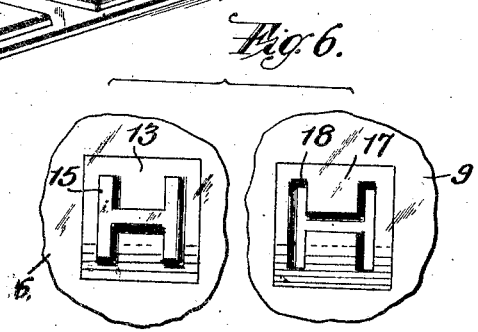
INVENTOR
Alfred P. Vollmar
BY
C. P. Grepel
ATTORNEY Patented Oct. 13, 1925.

1,557,504

UNITED STATES PATENT OFFICE.

ALFRED P. VOLLMAR, OF FOREST HILLS, NEW YORK, ASSIGNOR TO THE PAUL WISS-MACH GLASS CO., INC., OF LONG ISLAND CITY, NEW YORK, A CORPORATION OF WEST VIRGINIA.

APPARATUS FOR MOLDING GLASS.

Application filed August 27, 1921. Serial No. 496,025.

*To all whom it may concern:*

Be it known that I, ALFRED P. VOLLMAR, a citizen of the United States, and resident of Forest Hills, Long Island, county of Queens, and State of New York, have invented certain new and useful Improvements in Apparatus for Molding Glass, of which the following is a specification.

This invention relates to an improved method of molding in glass and has for its primary object to provide a simple and inexpensive method for the molding of letters, numerals or other ornamental forms or characters in glass sheets or plates.

In one embodiment of my invention a sheet of plastic glass is fed upon a moving table in which a series of male die members are arranged and said table finally passing beneath a vertically moving frame carrying a series of complementary female dies. The said frame is then lowered upon the sheet of plastic glass whereby the impressions are formed therein by the die members. The male die members are then lowered in the table, the glass sheet stripped therefrom and transferred or conveyed directly into a lehr.

It is a further general object of the invention to provide a method for molding characters in glass whereby the molding operation may be carried out in a very expeditious manner and at less expense than in the use of methods heretofore employed, while at the same time, a final product of superior merit is obtained.

With the above and other objects in view the invention consists in the improved method of molding characters in shaped glass which will be hereinafter more fully described and subsequently incorporated in the subjoined claim.

In the accompanying drawings wherein I have illustrated one embodiment of apparatus which may be advantageously employed in carrying out the improved method and in which similar reference characters designate corresponding parts throughout the several views, Figure 1 is a side elevation partly in section showing the initial step of the molding operation, Figure 2 is a similar view showing the upper die carrying frame lowered upon the glass sheet, Figure 3 is a longitudinal section, the upper frame being raised and the male die members lowered in the table to permit of the removal of the molded glass sheet, Figure 4 is a transverse section showing the relative positions of the die members as seen in Figure 2 of the drawings, Figure 5 is a fragmentary perspective view of the movable table with one of the male die members, Figure 6 is a plan view of complementary male and female die members, and Figure 7 is a sectional perspective view of a glass sheet as molded by my improved method.

Heretofore, it has been the practice in the art to place the glass sheet on a mold in which the letter, numeral or other character has been engraved, and then heating the sheet of glass until it is in a soft or plastic condition. The air between the engraving and the glass is then forced out and the glass drops into the cavity of the engraving, thereby forming in relief on the surface of the glass the desired numeral or character. Another method which has been employed is to heat the glass until it is plastic and then force the same into the mold by compressed air or by means of a blow-pipe.

The prior art methods just referred to are more or less uncertain, laborious and expensive and I propose by means of my present invention to eliminate such uncertainties and provide a method whereby the molding of ornamental characters in glass may be expeditiously performed without waste and in an accurate and reliable manner. For the purpose of enabling his improved method to be readily understood, I have, in the accompanying drawings, illustrated a certain form of apparatus which might be employed, though it is understood that the drawings are merely illustrative as the apparatus in its structural features might be modified in various particulars as conditions may indicate to be necessary or desirable.

Upon a suitable supporting frame 5 a table 6 is mounted for horizontal rectilinear movement. The frame includes uprights 7 and between the uprights and above the plane of the table 6 a die carrying frame 9 is arranged. The uprights are provided with slots 10 to receive guide pins or stops 11 fixed in the frame 9. Any suitable means may be provided for imparting a vertical movement to the die carrying frame 9 with respect to the table 6.

The table 6 is provided with a plurality of spaced openings 12, which, in the present instance, I have illustrated as of rectilinear form. A male die member 13 is vertically movable in each of these openings and is guided by the walls thereof. Any convenient means such as indicated at 14 in Figure 3 of the drawings may be provided for the purpose of vertically moving the die members 13 in unison with respect to the table 6. Each of these die members upon this upper surface carries in relief the letter, numeral or other character indicated at 15 which is to be molded in the glass.

The vertically movable frame 9 has spaced recesses 16 in its lower face in each of which a female die member 17 is fixed, the lower face of each die member 17 having the character impression indicated at 18 therein in complemental relation to the character 15 of an opposed die member 13 in the table.

The glass as shown at "g" is fed downwardly between rollers 19 in the form of a plastic sheet upon the surface of the table 6. The glass is in a sufficiently soft or plastic condition and of sufficient thickness that it will cover the relief characters 15 on the male die members and closely fill the spaces formed thereby.

As the plastic sheet of glass is fed to the table 6 this table is progressively moved in the frame 5 as shown by the arrows in Figure 1 of the drawings until the table is disposed entirely beneath the frame 9, at which time the feeding of the glass is discontinued. The frame 9 is now lowered and together with the die member 17 thereby exerts a compressing pressure upon the plastic sheet of glass. The glass sheet is thereby compressed to a uniform thickness as shown in Figure 3 and the characters on the male and female die members are molded therein. The clutch then moves the frame 9 with the die member 17 upwardly and the die members 13 in the table are simultaneously lowered beneath the surface of said table to the position seen in Figure 3. The molded sheet of glass may now be removed from the table and conveyed or transferred into the lehr for annealing and finishing in the usual way.

In Figure 7 of the drawings I have shown the finished product in the form of a glass sheet or plate 20 having spaced rectangular panels 21 molded therein. However, it will be apparent that any other design of ornamental forms might be molded in the glass.

From the foregoing description considered in connection with the accompanying drawings, the manner of operation of my improved glass molding method will be clearly understood. In the manner described, such ornamental glass sheets or plates may be very quickly and accurately molded. The apparatus employed in carrying out this method is of relatively simple character, and admits of the practice of the method by unskilled workmen. Thus the manufacturing cost of the product may be reduced while at the same time uniformity and a high degree of accuracy in the final product is obtained.

I have herein described one preferable manner of producing my improved method, but it is to be understood that the same is susceptible of certain minor variations and I hereby reserve the privilege of resorting to all such legitimate changes as may be fairly embodied within the spirit and scope of the invention as claimed.

I claim:

A machine for molding glass comprising a table mounted for horizontal rectilinear movement adapted to receive a layer of soft or plastic glass as it is moved horizontally, said table having a plurality of spaced apertures, a vertically movable die mounted in each of said apertures, a vertically movable table carrying die members adapted to move downwardly into engagement with the upper surface of the layer of glass on the horizontal table when said horizontal table is positioned under said vertically movable table with the dies in the upper and lower tables in cooperating relationship and means for withdrawing the upper tables and dies and lowering the lower set of dies and permit the molded glass to rest on said horizontally movable table free from the die members.

In testimony that I claim the foregoing as my invention, and I have signed my name hereunder.

ALFRED P. VOLLMAR.